US012663114B2

(12) United States Patent
    Allum

(10) Patent No.: US 12,663,114 B2
(45) Date of Patent: Jun. 23, 2026

(54) HANDHELD HANGER INSTALLATION DEVICE

(71) Applicant: Harbinger, LLC, Livermore, CA (US)

(72) Inventor: Todd William Allum, Livermore, CA (US)

(73) Assignee: Harbinger, LLC, Livermore, CA (US)

( * ) Notice: Subject to any disclaimer, the term of this patent is extended or adjusted under 35 U.S.C. 154(b) by 32 days.

(21) Appl. No.: 18/414,344

(22) Filed: Jan. 16, 2024

(65) Prior Publication Data

US 2024/0240748 A1 Jul. 18, 2024

Related U.S. Application Data

(60) Provisional application No. 63/580,312, filed on Sep. 1, 2023, provisional application No. 63/580,324, filed on Sep. 1, 2023, provisional application No. 63/480,227, filed on Jan. 17, 2023.

(51) Int. Cl.
    *F16M 13/02* (2006.01)
(52) U.S. Cl.
    CPC .................................. *F16M 13/02* (2013.01)
(58) Field of Classification Search
    CPC .. F16M 13/02; A47G 1/16; A47G 1/20; Y10S 248/909; B25C 5/06; B25C 5/11; B25C 5/00
    See application file for complete search history.

(56) References Cited

U.S. PATENT DOCUMENTS

| | | | | |
|---|---|---|---|---|
| 1,185,587 | A | * | 5/1916 | Bragg ..................... F16B 15/04 248/301 |
| 1,210,610 | A | * | 1/1917 | Dehn ....................... A47G 1/16 248/909 |
| 2,746,043 | A | * | 5/1956 | Zaller ...................... B25C 5/06 227/127 |
| 2,746,044 | A | * | 5/1956 | Cusumano ............... B25C 5/06 227/132 |

(Continued)

FOREIGN PATENT DOCUMENTS

| | | |
|---|---|---|
| EP | 2 592 286 A1 | 5/2013 |
| KR | 10-1876830 B1 | 7/2018 |

OTHER PUBLICATIONS

International Search Report for Application No. PCT/US2024/011868 dated May 2, 2024.

*Primary Examiner* — Nathaniel C Chukwurah
(74) *Attorney, Agent, or Firm* — Artegis Law Group, LLP

(57) ABSTRACT

In various embodiments, a handheld hanger apparatus comprises an internal impact element that provides a driving force to a hanging device, and an energized element attached to the internal impact element that receives a first energy and converts the first energy to the driving force, where, upon the internal impact element providing the driving force to install a first portion of the hanging device into a surface of a wall, at least a second portion of the hanging device is proud to the wall. In some embodiments, a handheld hanger apparatus comprises the energized element discharges a rigid member at an acute angle relative to a wall surface, where, upon the energized element discharging the rigid member to install a first portion of the rigid member into the wall, at least a second portion of the rigid member remains outside the wall, configured to hold an object.

19 Claims, 13 Drawing Sheets

(56)            References Cited

U.S. PATENT DOCUMENTS

| | | | | |
|---|---|---|---|---|
| 3,753,524 A * | 8/1973 | Heyward | .................. | B25C 5/06 |
| | | | | 227/132 |
| 3,940,044 A * | 2/1976 | LaPointe | .................. | B25C 5/06 |
| | | | | 227/8 |
| 3,948,426 A * | 4/1976 | La Pointe | ................ | B25C 5/10 |
| | | | | 227/8 |
| 4,119,258 A * | 10/1978 | Ewig, Jr. | .................. | B25C 5/06 |
| | | | | 227/132 |
| 4,184,620 A * | 1/1980 | Ewig | ........................ | B25C 5/06 |
| | | | | 227/128 |
| 4,334,613 A * | 6/1982 | Males | .................... | A47C 23/05 |
| | | | | 206/340 |
| 5,520,318 A | 5/1996 | Sloop | | |
| 7,395,998 B2 * | 7/2008 | Peterson | .................. | A47G 1/20 |
| | | | | 248/218.2 |
| 7,604,149 B2 * | 10/2009 | Tsai | ......................... | B25C 5/11 |
| | | | | 227/132 |
| 2006/0134375 A1 * | 6/2006 | Peterson | .................. | A47G 1/20 |
| | | | | 428/100 |
| 2008/0296456 A1 * | 12/2008 | Lien | ......................... | A47G 1/20 |
| | | | | 248/304 |
| 2020/0039046 A1 * | 2/2020 | Takidis | ................ | B25C 5/0207 |
| 2020/0086469 A1 | 3/2020 | Friedman | | |
| 2023/0001557 A1 | 1/2023 | Marks | | |

* cited by examiner

HANDHELD HANGER INSTALLATION DEVICE

CROSS-REFERENCE TO RELATED APPLICATIONS

This application claims priority benefit of the United States Provisional Patent Application titled, "HANDHELD HANGER INSTALLATION DEVICE," filed on Jan. 17, 2023, and having Ser. No. 63/480,227; the United States Provisional Patent Application titled, "WALL HANGER ADAPTER," filed on Sep. 1, 2023, and having Ser. No. 63/580,324; and the United States Provisional Patent Application titled, "HANDHELD HANGER ALIGNMENT AND INSTALLATION DEVICE," filed on Sep. 1, 2023, and having Ser. No. 63/580,312. The subject matter of these related applications is hereby incorporated herein by reference.

BACKGROUND

Field of the Various Embodiments

This application relates to hanging devices, and, more specifically, to a handheld hanger installation device.

Description of the Related Art

Various conventional products exist for installing a hook or hanging device onto a wall, where the hook or hanging device is installed in order to hang framed items, decorations, mirrors, or the like. A general requirement for such hanging devices is to support a vertical load along the plane of the wall. Various hanging devices designed for this purpose are rated based on vertical holding capacity (e.g., ratings based on holding loads of 5 lbs., 10 lbs., 15 lbs., 20 lbs., etc.). Aside from the vertical holding capacity, other characteristics of these hanging devices include, for example, ease of installation, cost, limited damage to the wall during installation, aesthetic appearance once installed (if visible), any witness of wall damage once the device is no longer used and removed.

Wall hanging devices specifically designed with these target characteristics in mind generally performing better in holding objects from the wall compared to the performance of common nails or screws. However, despite how ubiquitous commercially available hanging devices are, customers generally still use nails or screws for hanging framed items, decoration, mirrors, or the like onto walls. For example, one drawback of conventional hooks and hanging devices, as well as conventional nails and screws, is that such devices require hand tools that customers either do not have, or do not know how to use properly. Some common hand tools used for installing commercially available wall hooks, nails, and screws, are a hammer or a screwdriver. Both of these hand tools require a certain level of hand dexterity, visual acuity, hand-to-eye coordination, and hand strength. Furthermore, in instances when a customer desires to hang objects in a particular arrangement relative to other objects on the wall (e.g., a collage of framed pictures), a customer is required to perform multiple steps and/or measurements to ensure that a given wall hanging device is installed at the correct location on the wall. Consequently, the process of managing the proper installation of the wall hanging device at the correct location is cumbersome to the user.

In addition, various conventional nails and screws do not provide sufficient support strength in a pulverulent wallboard (e.g., drywall) when the nail or screw is not of sufficient size, or if the nail or screw is not installed correctly. Further, improper installation of conventional nails, screws, or wall hanging devices also causes irreversible damage on or below the visible surface of the wallboard. Such results are also exacerbated by an anchoring system for the conventional nail, screw, or wall hanging device penetrating to a depth that exceeds the thickness of the wallboard, and potentially striking a wall stud (metal or wood), plumbing element, or electrical wire(s) located within the wall. Any severe damage to the portions of the wall behind the wallboard or on the visible surface of the wallboard becomes apparent after installation. For example, once the hanging device is no longer needed and subsequently removed, the installation damage becomes an eyesore and a challenge to properly repair without permanent renovations.

Sometimes, the hanging device supports an object on the wall via a connecting string, wire, or other hanging material. In such instances, which the object does not obscure the view of the wall hook, nail, or screw, that is used to support the object from the wall. Conventional wall hangers, nails, screws, or other common wall hangers oftentimes provide an undesirable aesthetic result, as such devices are not aesthetically pleasing and distract from the desired visual intent of installing the object on the wall. For example, these conventional hanging devices are visibly significant due to being proud to the wall, and/or cover a relatively large surface area on the wall relative to the portion of the hanging device (e.g., hook) that is needed to hang an object. One such example of a wall hook that covers a relatively large surface area is known from U.S. Pat. No. 9,775,450, which is hereby incorporated by reference.

As the foregoing illustrates, what is needed in the art are a wall hanging anchor type device and related installation method that facilities ease of installation provides for improved alignment, and causes less damage on a surface of a wall.

SUMMARY

In various embodiments, a handheld hanger apparatus comprises an internal impact element that provides a driving force to a hanging device, and an energized element attached to the internal impact element, the energized element receiving a first energy and converting the first energy to the driving force, where, upon the internal impact element providing the driving force to install a first portion of the hanging device into a surface of a wall, at least a second portion of the hanging device is proud to the wall.

In various embodiments, a handheld hanger apparatus comprises an energized element that discharges a rigid member at an acute angle relative to a surface of a wall, where, upon the energized element discharging the rigid member to install a first portion of the rigid member into the wall, at least a second portion of the rigid member remains outside the wall and is configured to hold an object.

In various embodiments, a method comprises receiving, by a handle of a handheld hanger apparatus, a first force, where the handheld hanger apparatus is aligned with a hanging device at a first position along a surface of a wall, converting, by an energized element of the handheld hanger apparatus, the first force into a driving force, causing, by the energized element, an internal impact element of the handheld hanger apparatus to provide the driving force to install the hanging device at an acute angle relative to the surface of the wall, where at a first portion of the hanging device extends into the wall at the acute angle, and a second portion of the hanging device is proud to the wall.

At least one technical advantage of the disclosed technique relative to the prior art is that the disclosed handheld hanger installation mechanism and wall hanging devices ease the effort of installing wall hanging devices on various types of walls. In particular, by using the handheld hanger installation mechanism to install one or more of the disclosed wall hanging devices, a user can install one or more wall hanging devices at desired locations along a surface of a wall with improved alignment, reduced likelihood of damage to the wallboard, and reduced likelihood of damage to utilities behind the wallboard. Further, by driving the wall hanging device into the surface of a wall at an acute angle relative to the wall, the disclosed handheld hanger installation mechanism and wall hanging devices provide minimal visual surface exposure as compared to conventional wall hangers, nails, and screws. In addition, the disclosed handheld hanger installation device automatically installs the wall hanging device at a preferred and prescribed depth, angle and distance proud to the wall so that the user will not have to manage these requirements while at the same time manage proper alignment. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

4

Figure 8:
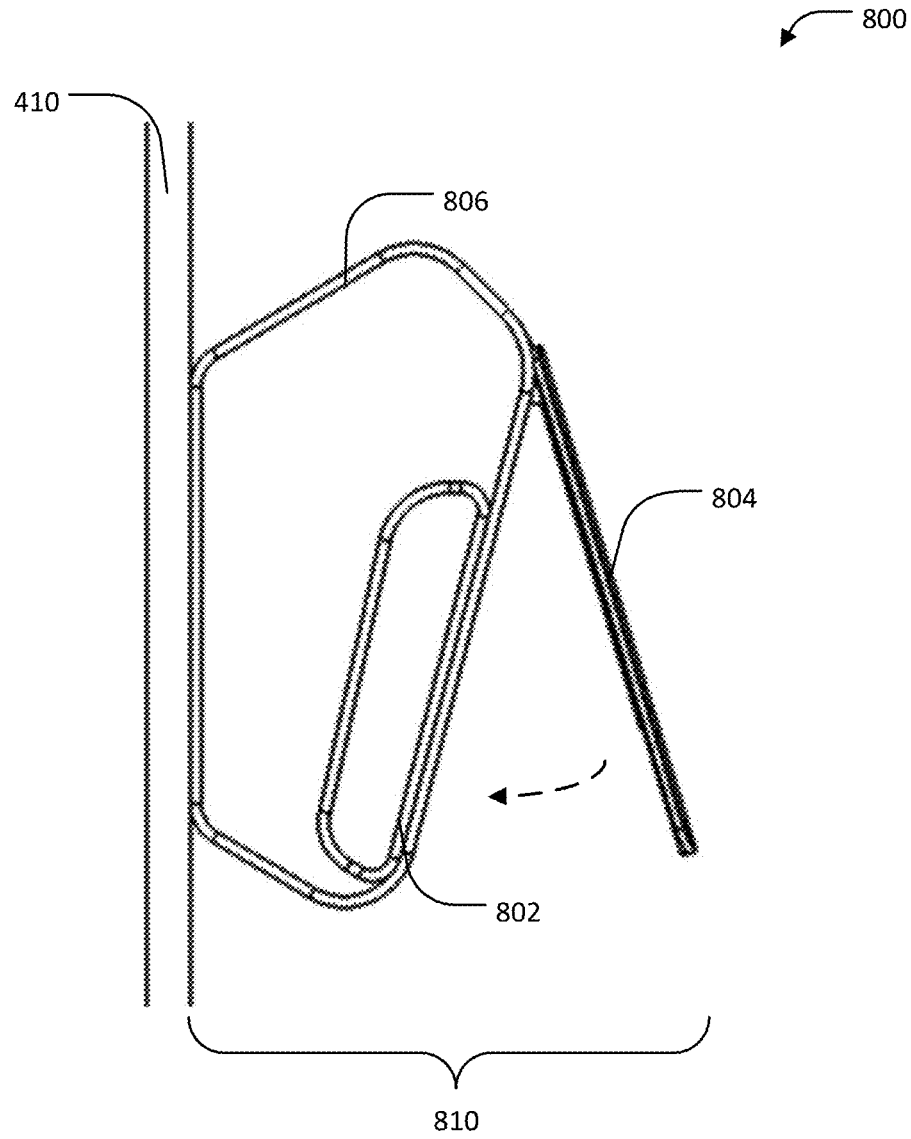
FIG. 8 illustrates a side view of a handheld hanger installation mechanism positioned on the wallboard, according to various embodiments of the present disclosure.
Figure 10:
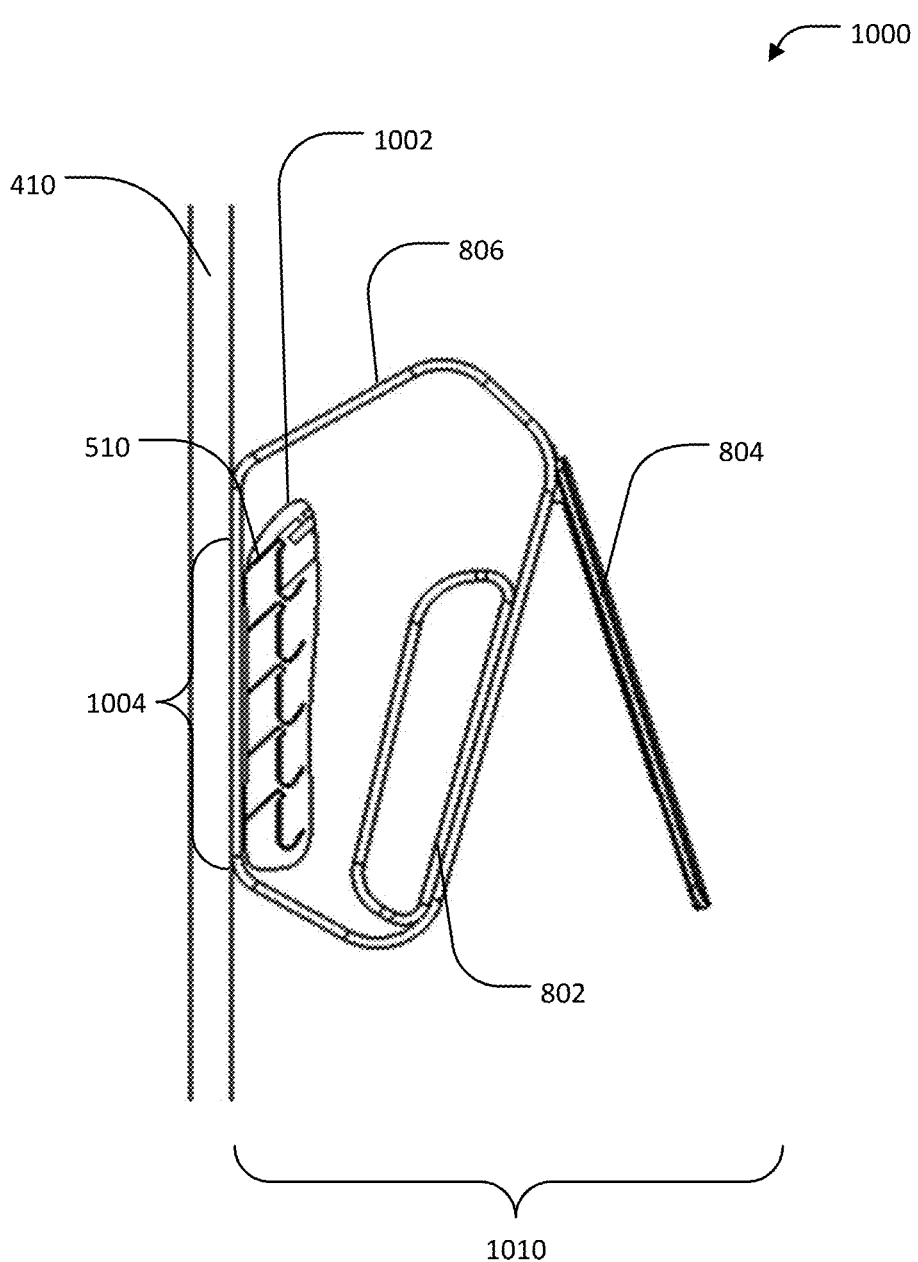
Figure 11:
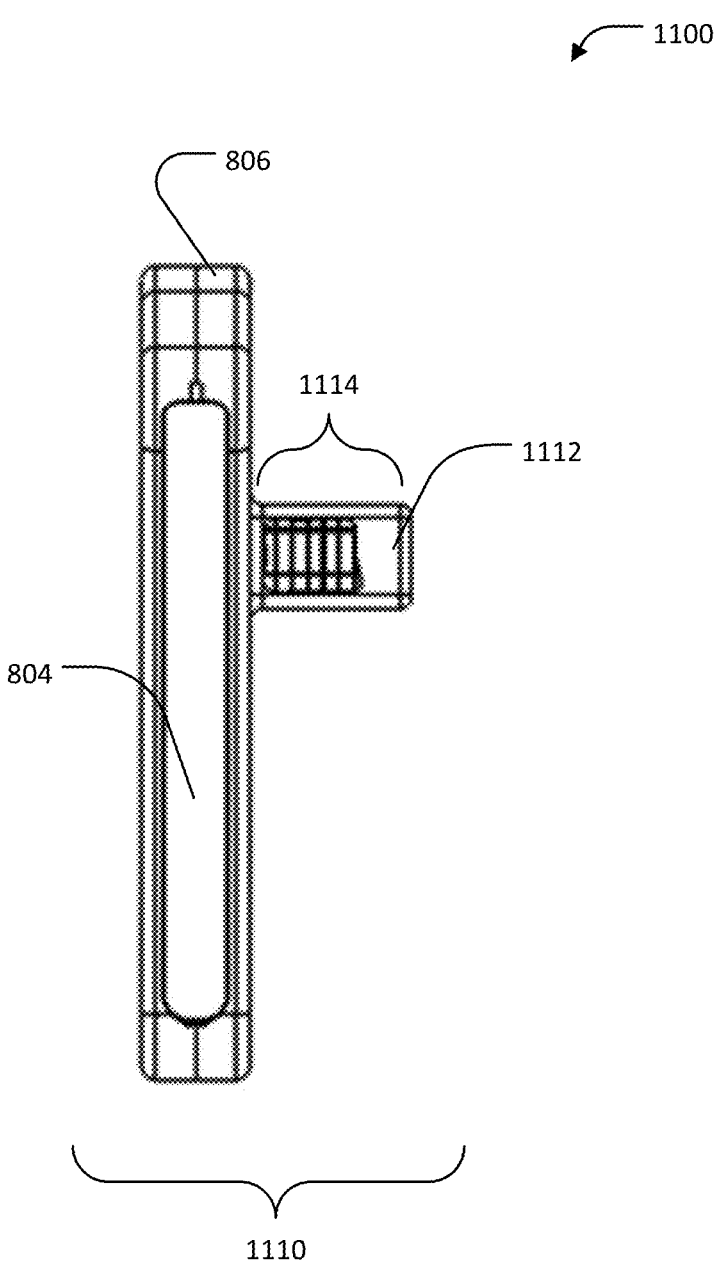
Figure 12:
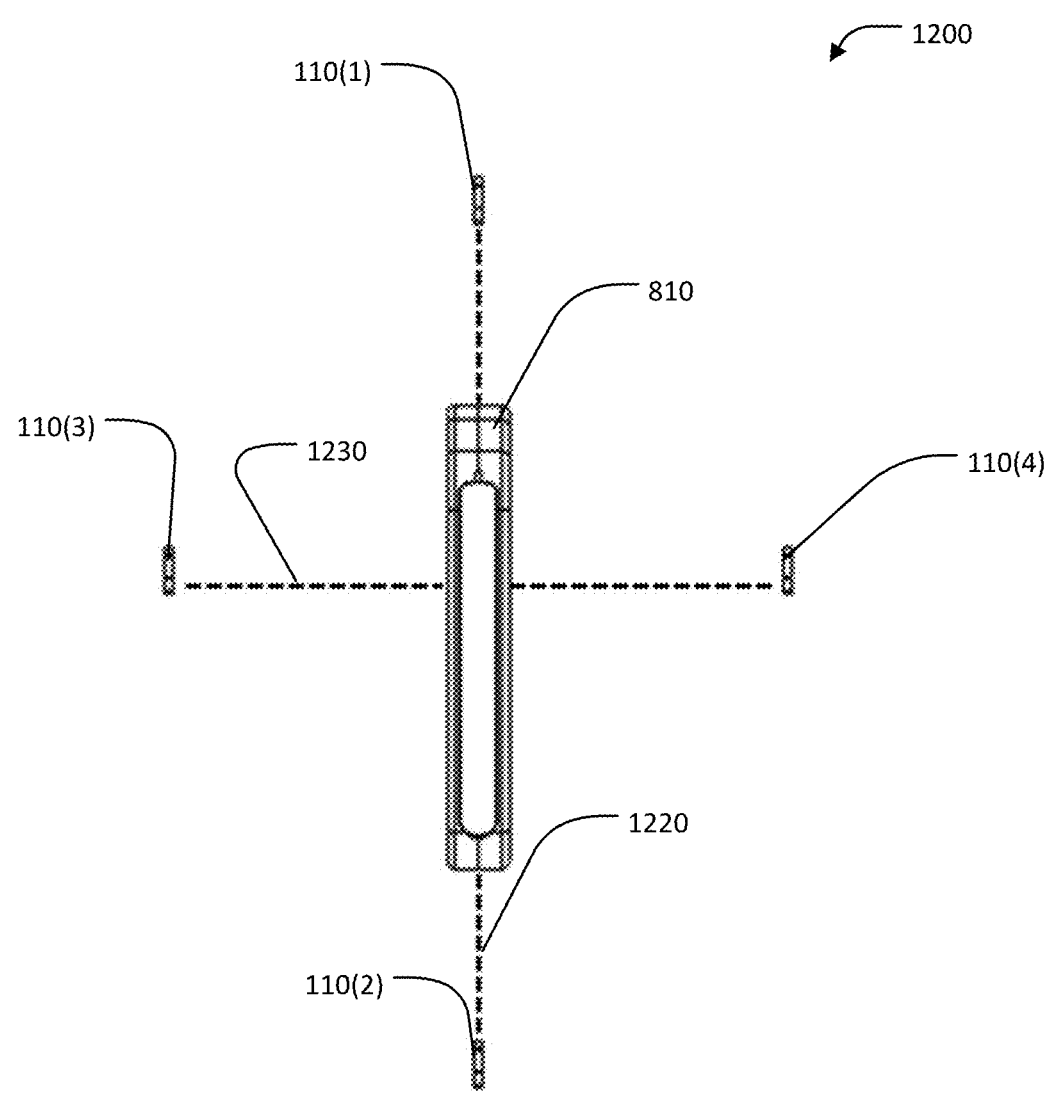
Figure 13:
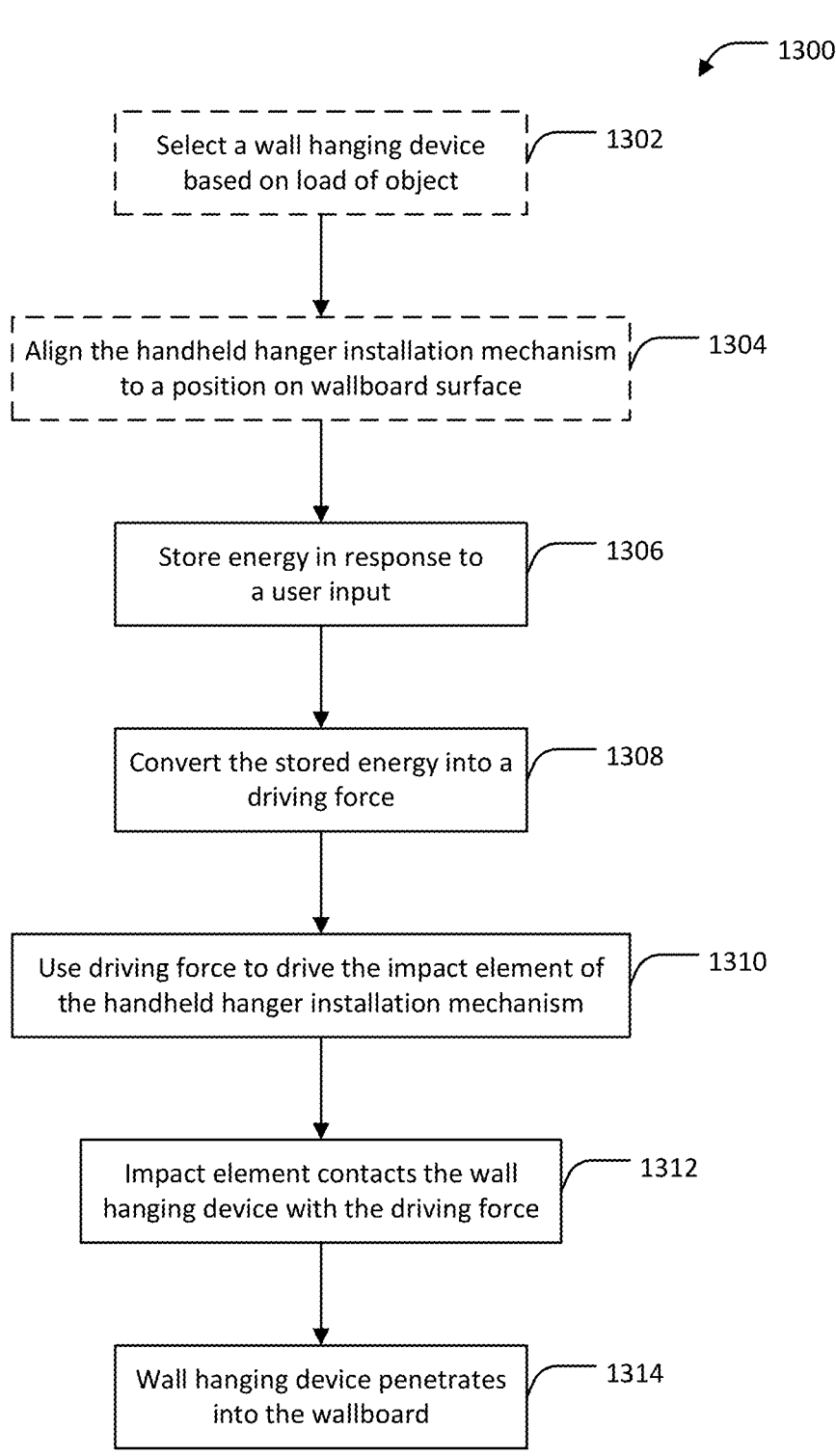

FIG. 10 illustrates a side view of a handheld hanger installation mechanism including a storage reservoir that stores a group of wall hanging devices; according to various embodiments of the present disclosure;

FIG. 11 illustrates a front view of a handheld hanger installation mechanism including a storage reservoir positioned laterally to the major axis of the handheld hanger installation mechanism, according to various embodiments of the present disclosure;

FIG. 12 illustrates a front view of the handheld hanger installation mechanism of FIG. 8 positioned on the wallboard with a vertical light line and a horizontal light line projected on the wallboard surface, according to various embodiments of the present disclosure; and FIG. 13 sets forth a flow diagram of method steps for installing a wall hanging device using a handheld hanger installation mechanism, according to various embodiments of the present disclosure.

DETAILED DESCRIPTION

In the following description, numerous specific details are set forth to provide a more thorough understanding of the various embodiments. However, it will be apparent to one skilled in the art that the inventive concepts may be practiced without one or more of these specific details. The following detailed description is merely exemplary in nature and is not intended to limit the disclosure or the application and uses of the disclosure. Although the descriptions of embodiments hereof are in the context of wall hangers, the disclosure may also be used in any other context and/or situations where it is deemed useful.

Specific embodiments of the present disclosure are now described with reference to the figures, where like reference numbers indicated identical or functionally similar elements. The term "wallboard" is used to refer to drywall. However, it is recognized that the wall hanger device and hanger installation mechanism could be suitable for other wallboard materials, such as cork, foam, wood, plaster, and other pulverulent materials. Accordingly, the term wallboard is used herein to broadly encompass all of these wallboard materials.

The terms "subsurface," "flush," and "proud" are used in the following description with respect to a position or direction relative to the external surface of the wallboard. "Subsurface" is a position below the external surface of the wallboard, within the wallboard or within the wall cavity. "Flush" is a position on or substantially near the external surface of the wallboard. "Proud" is a position above the external surface of the wallboard or more into the room.

Figure 1:
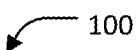
FIG. 1 illustrates a side view of an exemplary wall hanging device, according to various embodiments of the present disclosure.
Figure 1:
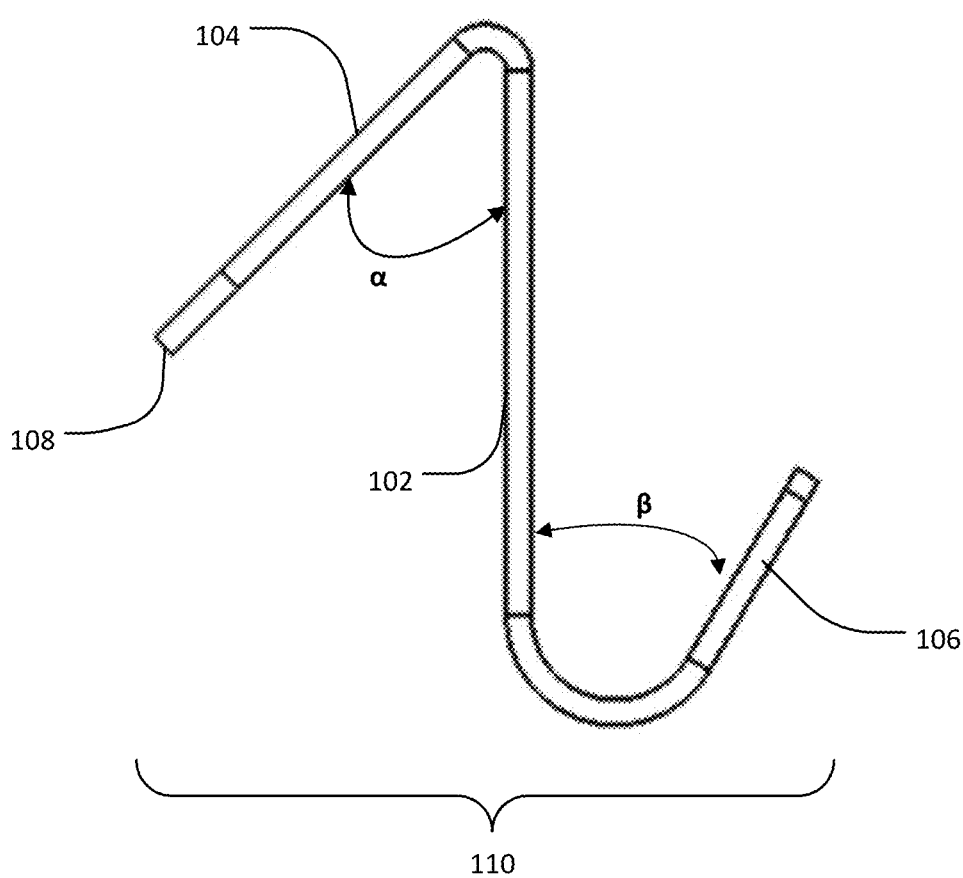
Figure 2:
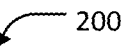
FIG. 2 illustrates an isometric view of the exemplary wall hanging device of FIG. 1, according to various embodiments of the present disclosure.
Figure 2:
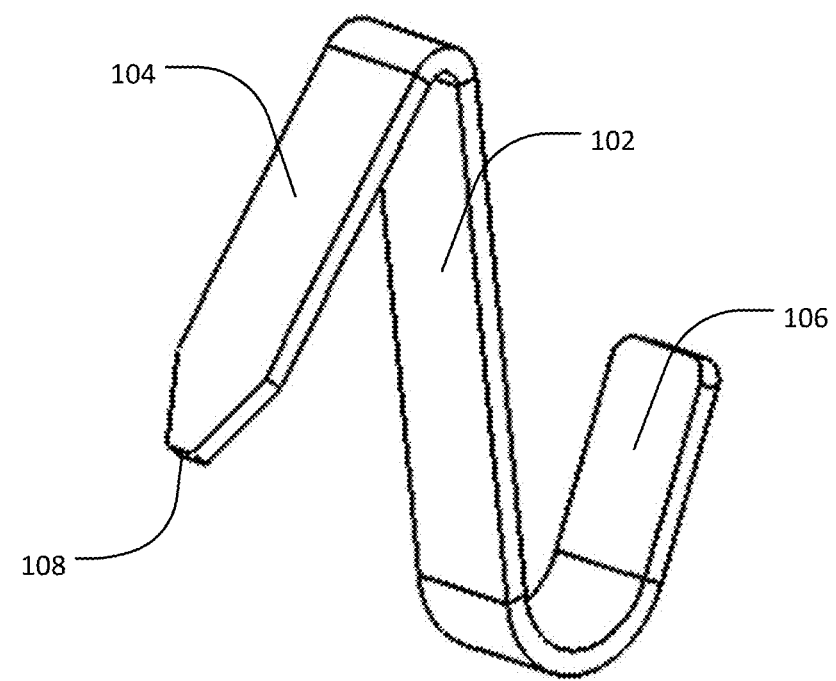

FIG. 1 illustrates a side view 100 of an exemplary wall hanging device 110. FIG. 2 illustrates an isometric view 200 of the exemplary wall hanging device 110 of FIG. 1, according to various embodiments of the present disclosure. As shown, the wall hanging device 110 includes, without limitation, a base member 102, an anchor member 104, a hook member 106, and a pointed tip 108.

In various embodiments, the wall hanging device 110 is a wall hanger (e.g., a hook) or a straight rigid body configured to hang an object on a wall. In some embodiments, the base member 102, anchor member 104, and hook member 106 are one contiguous piece. Additionally, or alternatively, in various embodiments, the wall hanging device 110 is constructed of thin sheet metal, plastic, or other similar rigid material.

The base member 102 has front and back sides. The rear side is configured to rest flush with a surface of a wallboard once the wall hanging device 110 is installed into the wall. In such instances, the only elements of the wall hanging device 110 that are proud of the wallboard surface is the hook member 106 while the base member 102 is flush to the surface. In some embodiments, the long axis of the base member 102 is vertically orientated. The base member 102 is attached to at least one hook member 106 that protrudes forwardly at the bottom of the base member 102. In some embodiments, the hook member 106 protrudes at an upward direction relative to the long axis of the base member 102, enabling the wall hanging device 110 to catch and holding an object, or a wire, string, bracket, or the like that is fastened to the object. In various embodiments, the hook member 106 protrudes as a line or as an arc at an acute angle (β) relative to the long axis of the base member 102.

In various embodiments, the wall hanging device 110 includes at least one anchor member 104 that protrudes rearwardly at the top of the base member 102. In some embodiments, the anchor member 104 protrudes in a downward direction at an acute angle (α) relative to the long axis of the base member 102. In such instances, the configuration of the anchor member 104 relative to horizontal enables the wall hanging device to exert higher anchoring forces when a vertical load is applied to the wall hanging device 110, or if a vertical load being applied to the wall hanging device 110 increases.

In some embodiments, the anchor member 104 is tapered or beveled into the pointed tip 108 that penetrates the surface of the wallboard. The pointed tip 108 facilitates installation of the wall hanging device 110 through the wallboard. The pointed tip also reduces damage that the wall hanging device 110 applies to the wallboard during installation. Although the wall hanging device 110 includes a symmetrically pointed tip, a beveled, a sharpened tip, or the like, can be included in the wall hanging device 110.

In various embodiments, the length of the anchor member 104 is configured based on characteristics of the wallboard and the object to be hung. For example, the length of the anchor member 104 can be a function of the thickness of the wallboard. In such instances, the anchor member 104 is to protrude far enough from the base member 102 as to be able to penetrate the wallboard to a depth sufficient enough for anchoring. In addition, the length of the anchor member is not to protrude too far such that the anchor member 104 breaks through the back side of the wallboard. For example, the perpendicular distance from the base member 102 to the pointed tip 108 of the anchor member 104 can as long as possible without exceeding the thickness the wallboard (e.g., not exceeding a wallboard thickness of approximately ½"). In such instances, a user selects a wall hanging device 110 for use based on the characteristics of the wallboard and the length of the anchor member 104.

Additionally, or alternatively, the angle (α) formed between the anchor member 104 and the base member 102 is based on the thickness of the wallboard and/or a target load capacity. For example, the angle (α) can be an acute angle of 45°, however the angle can range from approximately 0° to 90°. Similarly, the angle (β) between the hook member 106 and the base member 102 can also be an acute angle of 45°, however the angle can range from approximately 0° to 90°. In various embodiments, the angle (β) and/or the length of the hook member 106 are configured based on the object to be hung. For example, the length of the hook member 106 is configured to protrude far enough from the base member 102 so that the hook member 106 will both: (i) allow the hook member 106 to easily catch the object, or the wire, string, or bracket, attached to the object, and (ii) not protrude excessively from the base member 102 so that the wall hanging device 110 interferes with the object or becomes aesthetically displeasing.

Figure 3:
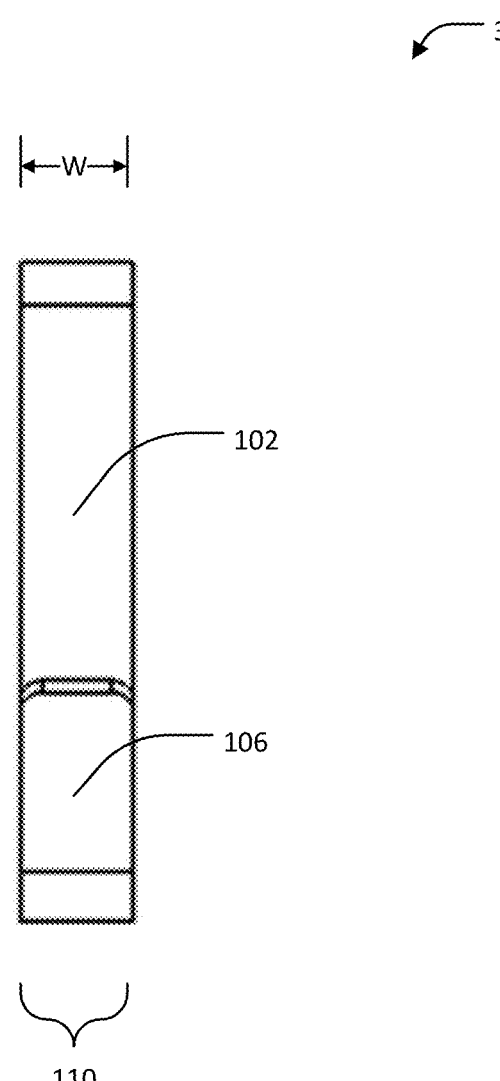
FIG. 3 illustrates a front view of the wall hanging device of FIG. 1, according to various embodiments of the present disclosure.

FIG. 3 illustrates a front view 300 of the wall hanging device 110 of FIG. 1, according to various embodiments of the present disclosure. The dimension "W" is the width of the wall hanging device 110. In various embodiments, the vertical load capacity of the wall hanging device 110 is a function of a constant width (W), or an average width when the width of the wall hanging device 110 varies, of the wall hanging device 110. In such instances, the wall hanging device 110 is configured with a width that meets the load of the object that is to be hung.

For example, a user can select a first wall hanging device with a first width that has a load capacity to hold lightweight items, such as a piece of paper, or a small frame; in such instances, the wall hanging device 110 can have a first width of 0.6 mm, similar to 23-gauge wire (e.g., the width of wire used in a paper stapler). In another example, the user can select a second wall hanging device 110 with a second width that has a load capacity to hold heavyweight items, such as mirrors, metallic decorations, clocks and the like. In these instances, the second width can be 25 mm or more. As such, the width (W) of the wall hanging device 110 can be useful between the ranges of 0.25 mm to widths greater than 75 mm. In various embodiments, the wall hanging device 110 has a width to thickness ratio of approximately 10:1. In such instances, the relatively flat footprint of the wall hanging device 110 leaves minimal witness of damage to the wallboard once removed due to how thin the wall hanger is. For example, if the wall hanger width (W) is selected to be 6.5 mm, the thickness of the wall hanger material can be around 0.65 mm, as an example. In such instances, once the wall hanger is removed, a narrow incision like witness will remain.

Figure 4:
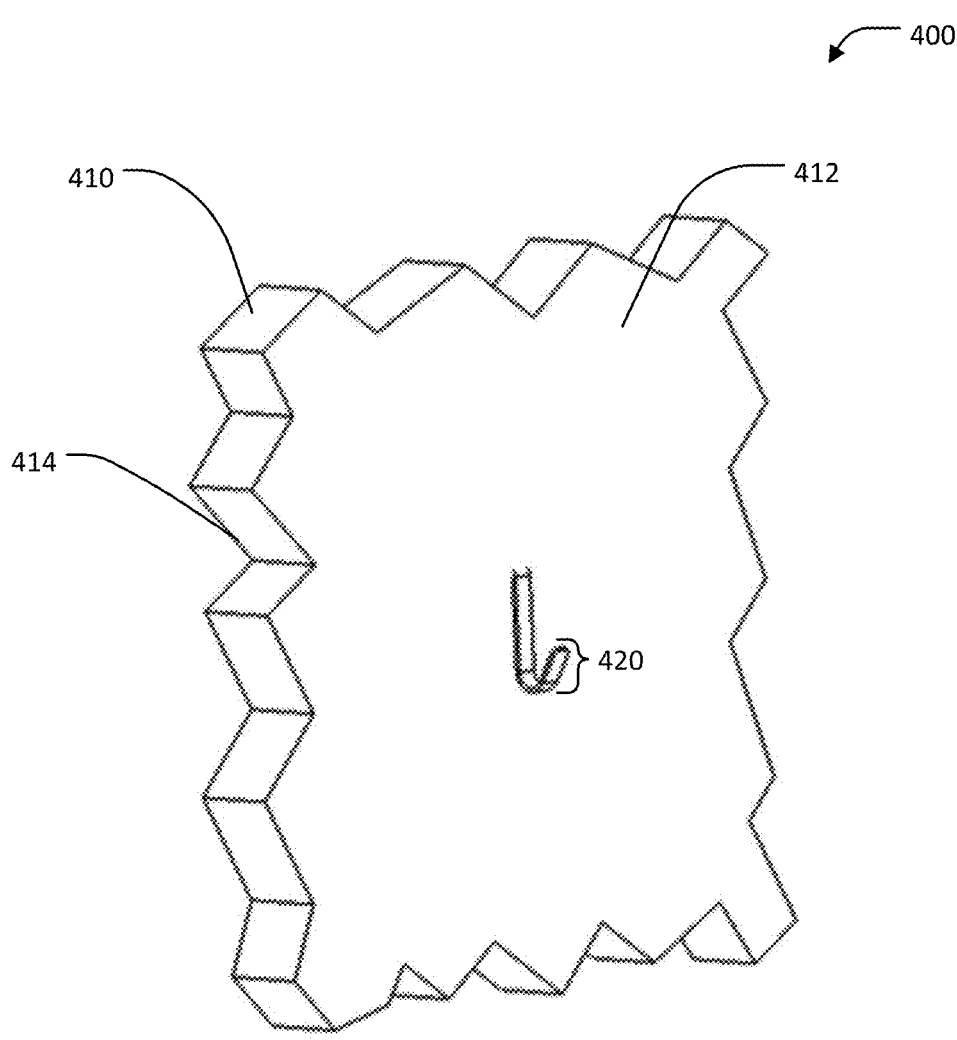
FIG. 4 illustrates an isometric view of the wall hanging device of FIG. 1 installed into a section of wallboard, according to various embodiments of the present disclosure.

FIG. 4 illustrates an isometric view 400 of the wall hanging device 110 of FIG. 1 installed into a section of wallboard 410, according to various embodiments of the present disclosure. As shown, the wallboard 410 includes, without limitation, a wallboard surface 412 and a backside 414. The wall hanging device 110 includes, without limitation, a section 420 that is proud to the wallboard.

In operation, the wall hanging device 110 is installed into the wallboard 410, where the anchor member 104 penetrates the wallboard surface 412 of the wallboard 410. In various embodiments, the length of the anchor member 104 and/or the angle (α) between the anchor member 104 and the base member 102 is configured such that the anchor member 104 does not penetrate the backside 414 of the wallboard. The wall hanging device 110 includes at least a section 420 that is proud to the wallboard surface 412. For example, the section 420 includes the hook member 106 of the wall hanging device 110, while the base member 102 of the wall hanging device 110 is flush with the wallboard.

In various embodiments, the wallboard 410 comprises an upright structure made of a rigid material, such as wood, masonry, stone, plaster, and so forth. In some embodiments, the wall hanging device 110 is installed in other types of structures. For example, the wall hanging device 110 can be installed in various types of fences, polls, posts, house eaves, roof eaves, and other various types of structures that can support a load of one or more objects. For example, multiple wall hanging devices 110 can be installed on a surface of one or more house eaves to support decorative lights and ornaments.

Figure 5:
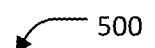
FIG. 5 illustrates a side view of a wall hanger device that includes a driving surface member, according to various embodiments of the present disclosure.
Figure 5:
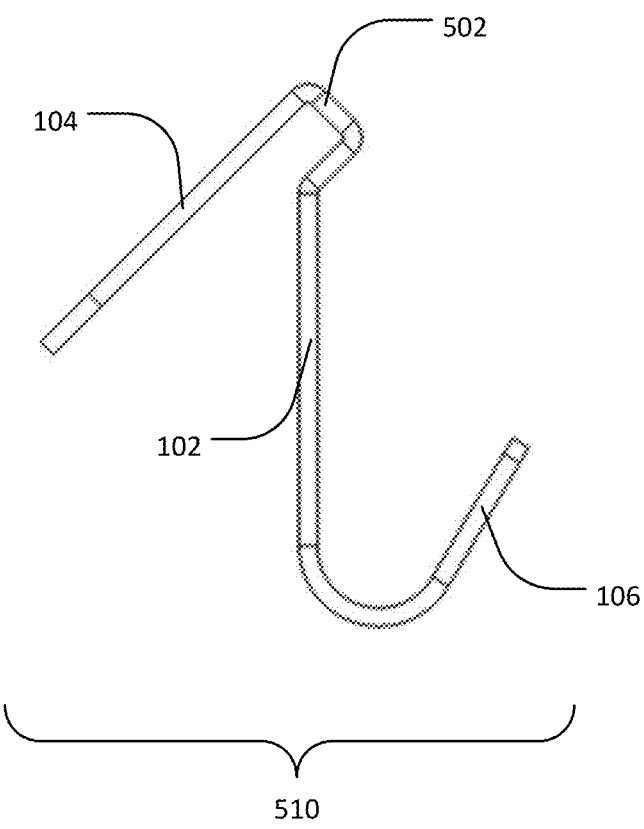
Figure 6:
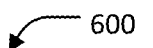
FIG. 6 illustrates an isometric view of the wall hanger device of FIG. 5, according to various embodiments of the present disclosure.
Figure 6:
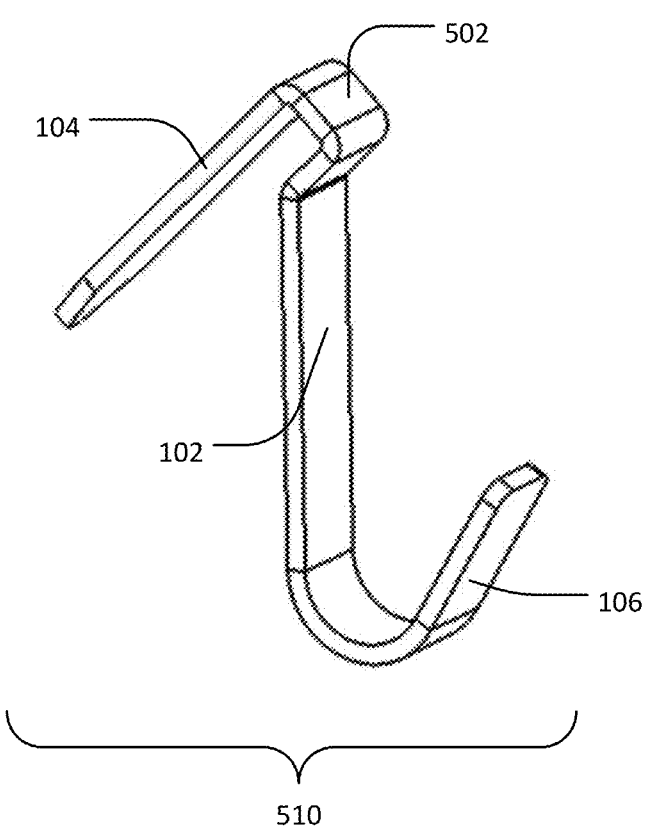

FIG. 5 illustrates a side view 500 of a wall hanger device 510 that includes a driving surface member 502, according to various embodiments of the present disclosure. FIG. 6 illustrates an isometric view 600 of the wall hanger device 510 of FIG. 5, according to various embodiments of the present disclosure. As shown, the wall hanger device 510 includes, without limitation, a base member 102, an anchor member 104, a hook member 106, and a driving surface member 502.

The wall hanging device 510 is similar to the wall hanging device 110, with the wall hanging device 510 further including the driving surface member 502 located between the base member 102 and the anchor member 104. In various embodiments, the driving surface member 502 is configured to interface best with an impact element, such as a hammer or a striker. In alternative embodiments, the driving surface member 502 can be configured to interface with other standard or customized driving tools, a mechanical hanger installation mechanism, and/or a powered hanger installation mechanism.

Figure 7:
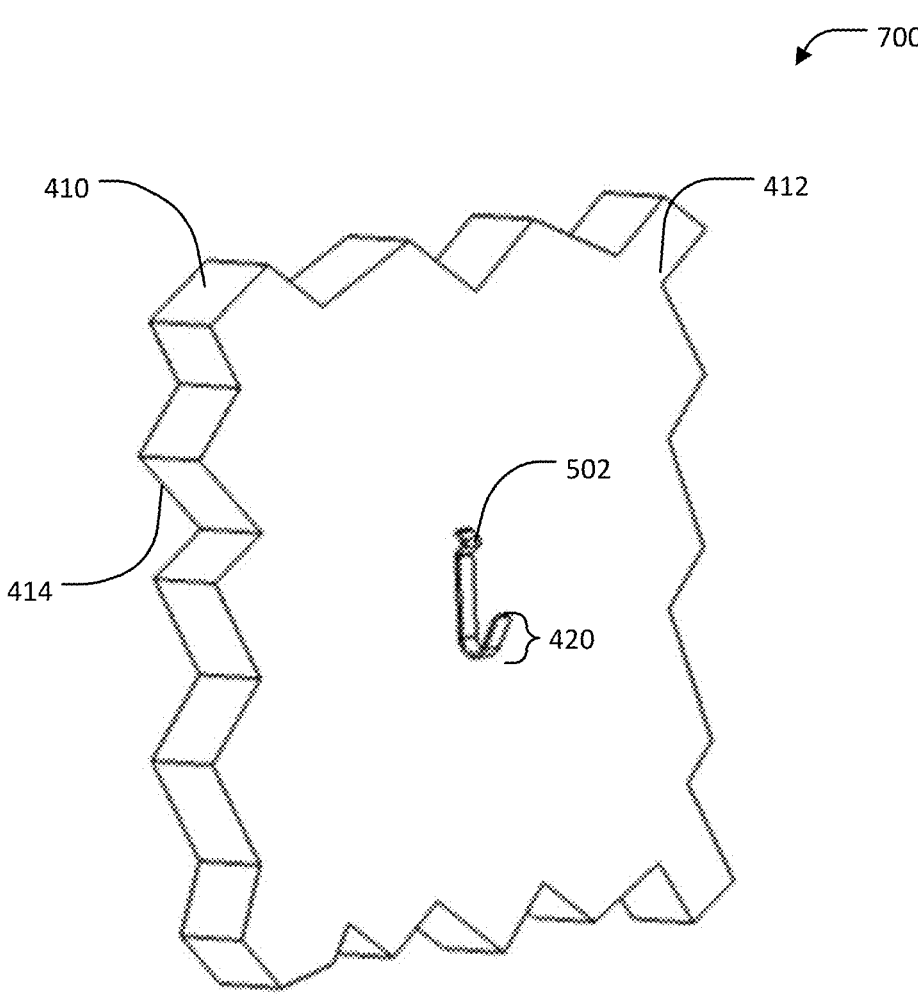
FIG. 7 illustrates an isometric view of the wall hanging device of FIG. 5 installed into a section of wallboard, according to various embodiments of the present disclosure.

FIG. 7 illustrates an isometric view 700 of the wall hanging device 510 of FIG. 5 installed into a section of wallboard 410, according to various embodiments of the present disclosure. In various embodiments, the wall hanging device 510 is installed into the wallboard 410, where the anchor member 104 penetrates the wallboard surface 412 of the wallboard 410. In various embodiments, the length of the anchor member 104 and/or the angle (α) between the anchor member 104 and the base member 102 is configured such that the anchor member 104 does not penetrate the backside 414 of the wallboard. In addition to the section 420 that is proud to the wallboard surface 412, the wall hanging device 510 also has the driving surface member 502 proud to the wallboard surface 412.

FIG. 8 illustrates a side view 800 of a handheld hanger installation mechanism 810 positioned on the wallboard 410, according to various embodiments of the present disclosure. As shown, the handheld hanger installation mechanism 810 includes, without limitation, a housing assembly 806 and a trigger handle 804. The housing assembly 806 includes, without limitation, a recess grip 802.

In various embodiments, the handheld hanger installation mechanism 810 is configured to install the wall hanging device 110, 510 into the wallboard 410. In various embodiments, the handheld hanger installation mechanism 810 is mechanical. In such instances, the manual operation of the handheld hanger installation mechanism 810 is similar to manual operation of mechanical staple gun. Additionally, or alternatively, the handheld hanger installation mechanism 810 can be electrically or pneumatically powered. In such instances, the manual operation of the handheld hanger installation mechanism 810 is similar to operation of powered staple gun or nail gun.

In various embodiments, the handheld hanger installation mechanism 810 is configured to include the recess grip 802 that interfaces with a user, enabling the user to insert one or more fingers through the recess grip 802 to hold and manipulate the handheld hanger installation mechanism 810. Additionally, or alternatively, the handheld hanger installation mechanism 810 includes the trigger handle 804. The trigger handle 804 is configured to fit into the palm of the same hand that is holding the handheld hanger installation mechanism 810 via the recess grip 802. In various embodiments, the trigger handle 804 forms a pivot point with the housing assembly 806 that enables the trigger handle 804 to rotate relative to the housing assembly 806.

In operation, the user triggers the handheld hanger installation mechanism 810 by squeezing the trigger handle 804, providing a force that rotates the trigger handle upon the pivot point within the housing assembly 806. In such instances, the rotation of the handle causes an energized element (not shown) included in the housing assembly 806 to store energy. The energized element performs a series of actions within the housing assembly 806 to convert the stored energy into a driving force that the handheld hanger installation mechanism 810 provides to a wall hanging device 110, 510. The driving force causes the wall hanging device 110, 510 to penetrate the wallboard 410. In some embodiments, the handheld hanger installation mechanism 810 stores energy until reaching a threshold associated with the mechanical energy provided by the trigger handle 804. For example, the user can move the trigger handle 804 until the trigger handle 804 reaches a threshold degree of rotation about its pivot point within the housing assembly 806. Once the trigger handle 804 reaches the threshold degree of rotation, energized element converts the energy provided by the trigger handle 804 into a driving force that the handheld hanger installation mechanism 810 provides to the wall hanging device 110, 510.

Figure 9:
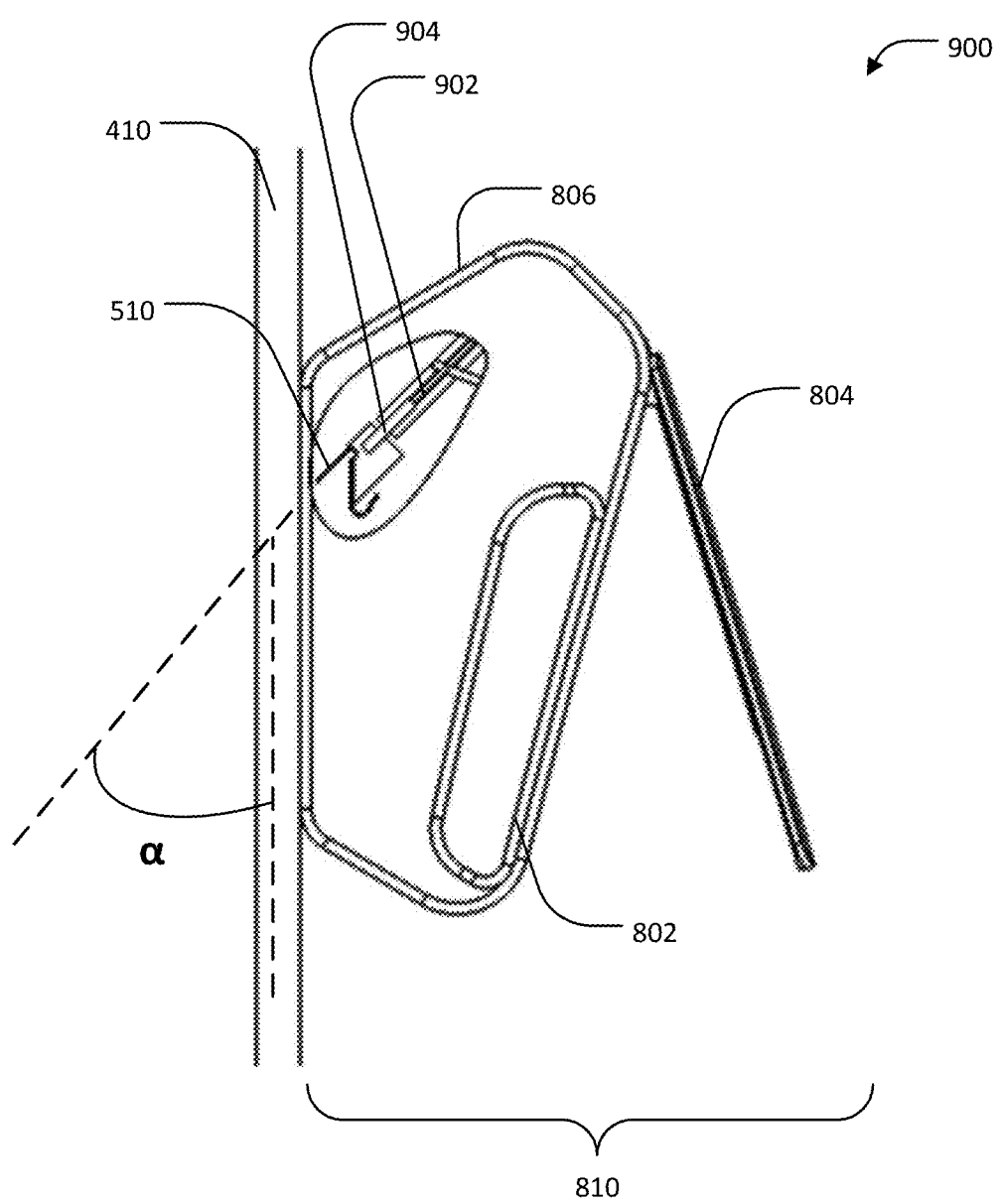
FIG. 9 illustrates a side view of the handheld hanger installation mechanism of FIG. 8 positioned on the wallboard and installing a wall hanging device, according to various embodiments of the present disclosure.

FIG. 9 illustrates a side view 900 of the handheld hanger installation mechanism 810 of FIG. 8 positioned on the wallboard 410 and installing a wall hanging device 510, according to various embodiments of the present disclosure. As shown, the handheld hanger installation mechanism 810 includes, without limitation, a housing assembly 806 and a trigger handle 804. The housing assembly 806 includes, without limitation, a recess grip 802, an energized element 902, and an impact element 904.

In operation, the handheld hanger installation mechanism 810 causes the energized element 902 to provide a driving force to the impact element 904. The impact element 904 contacts the driving surface member 502 of the wall hanging device 510. Alternatively, in some embodiments, the impact element 904 contacts a radius that connects the base member 102 and the anchor member 104 and portions of the base member 102, driving the wall hanging device 110. The contact transfers the driving force, causing the wall hanging device 510 to penetrate the wallboard surface 412, with the anchor member 104 traversing through the wallboard 410. In various embodiments, the impact element 904 contacts the driving surface member at the angle (α) corresponding to the angle between the anchor member 104 and the long axis of the base member 102. In such instances, the handheld hanger installation mechanism 810 installs the wall hanging device 510 into the wallboard 410 in a manner that maintains the angle (α) and causing the base member 102 to become flush with the wallboard surface 412. Installing the wall hanging device 510 in this manner minimizes damage to the wallboard 410 during installation.

In some embodiments, the energized element 902 is a spring that stores spring energy in response to the trigger handle 804 rotating. The spring then converts the stored spring energy into kinetic energy in the form of the driving force. In such instances, the impact element can be a hammer, striker, or another type of impact interface. Alternatively, the handheld hanger installation mechanism can be a powered device that discharges the wall hanging device 110, 510. In such instances, the energized element can be a solenoid and/or an electric motor (e.g., a rotational or linear motor) that converts stored electrical energy into the driving force. In such instances, the handheld hanger installation mechanism 810 can be a powered device that receives a user input to charge and/or discharge the solenoid. In another embodiment, the energized element can be a compressed air source, such as a carbon dioxide cartridge and/or an air compressor, which stores pneumatic energy and converts the pneumatic energy into kinetic energy in the form of the driving force. Various features of the wall hanging device 110, 510 can be configured to interface with the modality of impact element and/or discharge element used to provide the driving force necessary to propel the wall hanging device 110, 510 into the wallboard 410.

In various embodiments, the base member 102 of the wall hanging device 110, 510 acts as a mechanical stop to limit the penetration of the wall hanging device 110, 510 into the wallboard. Additionally, or alternatively, in some embodiments, the handheld hanger installation mechanism 810 controls the travel limit of the wall hanging device 110, 510 by controlling the driving force applied to the wall hanging device 110, 510. In such instances, the handheld hanger installation mechanism 810 controls the travel limit of the impact element 904 in order to set the wall hanging device 110, 510 at the target depth. For example, the handheld hanger installation mechanism 810 can set the travel limit such that the base member 102 is flush to the wallboard surface 412 when installed. Alternatively, the handheld hanger installation mechanism 810 can set the travel limit of the impact element 904 to a different depth that allows for a different height of the hook member 106 from the wallboard surface 412.

FIG. 10 illustrates a side view 1000 of a handheld hanger installation mechanism 1010 including a storage reservoir 1002 that stores a group 1004 of wall hanging devices 510, according to various embodiments of the present disclosure. As shown, the handheld hanger installation mechanism 1010 includes, without limitation, a housing assembly 806 and a trigger handle 804. The housing assembly 806 includes, without limitation, a recess grip 802 and a storage reservoir 1002.

In various embodiments, the handheld hanger installation mechanism 1010 is configured to include a storage reservoir 1002 that holds one or more wall hanging devices 110, 510 prior to and during installation. In some embodiments, the storage reservoir 1002 chambers a single wall hanging device 110. In such instances, the user loads a new wall hanging device 110, 510 into the storage reservoir 1002 before each wall hanger installation.

Alternatively, in various embodiments, the storage reservoir 1002 is configured to store a group 1004 of wall hanging devices 110, 510. In such instances, the handheld hanger installation mechanism 1010 is configured to automatically chamber a wall hanging device 110, 510 into a target position during installation. In some embodiments, the storage reservoir 1002 stores the wall hanging devices 110, 510 in a configuration that is in-line with the handheld hanger installation devices major axis (e.g., along a frontal plane parallel to the wallboard surface 412). For example, the handheld hanger installation mechanism 1010 can load the wall hanging device 110, 510 into position for a discharge into the wallboard 410 after the previous wall hanging device 110 was fired into the wallboard 410. In such instances, the user could load multiple wall hanging devices 110, 510 into the handheld hanger installation mechanism 1010 and fire several wall hanging devices 110, 510 into various locations on the wallboard surface 412 without any intervention until the storage reservoir 1002 is depleted of wall hanging devices 110, 510.

FIG. 11 illustrates a front view 1100 of a handheld hanger installation mechanism 1110 including a storage reservoir 1112 positioned laterally to the major axis of the handheld hanger installation mechanism 1110, according to various embodiments of the present disclosure. As shown, the handheld hanger installation mechanism 1110 includes, without limitation, a housing assembly 806 and a trigger handle 804. The housing assembly 806 includes, without limitation, the storage reservoir 1112.

In various embodiments, the handheld hanger installation mechanism 1110 is similar to the handheld hanger installation mechanism 1010. The handheld hanger installation mechanism 1110 contrasts from the handheld hanger installation mechanism 1010, where the storage reservoir 1112 is configured to store the group 1114 of wall hanging devices 110, 510 along an axis that is lateral to the main axis of the handheld hanger installation mechanism 1110.

FIG. 12 illustrates a front view 1200 of the handheld hanger installation mechanism 810 of FIG. 8 positioned on the wallboard 410 with a vertical light line 1220 and a horizontal light line 1230 projected on the wallboard surface 412, according to various embodiments of the present disclosure.

In various embodiments, the handheld hanger installation mechanism 810 includes one or more light sources (not shown) that provide alignment with any wall hanging devices 110 (e.g., the wall hanging devices 110(1)-110(4)) that are already installed on the wallboard surface 412. In such instances, the handheld hanger installation mechanism 810 provides a means of aligning of the handheld hanger installation mechanism 810 prior to firing a new wall hanging device 110, 510 into the wallboard 410. In various embodiments, the handheld hanger installation mechanism 810 projects the vertical light line 1220 to ensure that, once installed into the wallboard, the new wall hanging device 110, 510 is aligned vertically with the adjacent wall hanging devices 110(1), 110(2). Similarly, the handheld hanger installation mechanism 810 projects the horizontal light line 1230 to ensure that, once installed into the wallboard, the new wall hanging device 110, 510 is aligned horizontally with the adjacent wall hanging devices 110(3), 110(4).

The horizontal light line 1230 is configured to project the light line at an elevation equal to the height of the base of the hook member 106 new wall hanging device 110, 510. In some embodiments, the horizontal light line is at an elevation equal to another recognizable feature of the wall hanging device 110. The vertical light line 1220 is configured to project the light line along the major axis of the base member 102 of the wall hanging device 110, 510 for vertical alignment with the wall hanging devices 110(2), 110(3) that are already installed.

In various embodiments, the vertical light line 1220 and/or the horizontal light line 1230 is a laser line. Additionally, or alternatively, the light lines 1220, 1230 can be activated by means of an on/off switch, a trigger switch, button, or other type of manual input. Additionally or alternatively, to conserve battery life, the light lines 1220, 1230 can be activated after the handheld hanger installation mechanism 1010 is placed onto the wallboard surface via one or more switch(es) that are depressed when the base of the handheld hanger installation mechanism 1010 is pressed against the wall, or by means of a proximity switch.

FIG. 13 sets forth a flow diagram of method steps for installing a wall hanging device using a handheld hanger installation mechanism, according to various embodiments of the present disclosure. Although the method steps are described with reference to the devices of FIGS. 1-12, persons skilled in the art will understand that any system configured to implement the method steps, in any order, falls within the scope of the present disclosure.

Method 1300 begins at step 1302, where a wall hanging device is optionally selected based on a load of an object to be hung. In various embodiments, the vertical load capacity of the wall hanging device 110 is a function of a constant width (W), or an average width when the width of the wall hanging device 110 varies, of the wall hanging device 110. In such instances, the wall hanging device 110 is configured with a width that meets the load of the object that is to be hung.

At step 1304, the handheld hanger installation mechanism 810 is optionally aligned to a position on a wallboard surface 412. In various embodiments, the handheld hanger installation mechanism 810 can include a visual indication on the side of the device that communicates to the user the location where the hanging device 110, 510 will be ejected out of the hanger installation mechanism 810. In such instances, the user can align the indication on the side of the device to a mark on the wall. Alternatively, in some embodiments, the handheld hanger installation mechanism 810 includes one or more light sources that provide alignment with any wall hanging devices 110 (e.g., the wall hanging devices 110(1)-110(4)) that are already installed on the wallboard surface 412. In such instances, the handheld hanger installation mechanism 810 provides a means of aligning of the handheld hanger installation mechanism 810 prior to firing a new wall hanging device 110, 510 into the wallboard 410. For example, the handheld hanger installation mechanism 810 could include a light source that projects the vertical light line 1220 to ensure that, once installed into the wallboard, the new wall hanging device 110, 510 is aligned vertically with the adjacent wall hanging devices 110(1), 110(2). Similarly, the light source could project the horizontal light line 1230 to ensure that, once installed into the wallboard, the new wall hanging device 110, 510 is aligned horizontally with the adjacent wall hanging devices 110(3), 110(4).

At step 1306, the handheld hanger installation mechanism 810 stores energy in response to a user input. In various embodiments, the user triggers the handheld hanger installation mechanism 810 by squeezing the trigger handle 804, providing a force that rotates the trigger handle upon the pivot point within the housing assembly 806. In such instances, the rotation of the handle causes an energized element 902 included in the housing assembly 806 to store energy. Alternatively, the handheld hanger installation mechanism can be a powered device that stores electrical, mechanical, or another form of energy. In such instances, the handheld hanger installation mechanism 810 can cause an electrical storage device (e.g., a capacitor bank) to store electrical energy. In another embodiment, the energized element 902 can be a compressed air source, such as a carbon dioxide cartridge and/or an air compressor, that stores pneumatic energy.

At step 1308, the handheld hanger installation mechanism 810 converts the stored energy into a driving force. In various embodiments, the energized element 902 of the handheld hanger installation mechanism 810 converts the stored energy into kinetic energy in the form of a driving force. In some embodiments, the handheld hanger installation mechanism 810 stores energy until reaching a threshold associated with the mechanical energy provided by the trigger handle 804. For example, the user can move the trigger handle 804 until the trigger handle 804 reaches a threshold degree of rotation about its pivot point within the housing assembly 806. Once the trigger handle 804 reaches the threshold degree of rotation, energized element converts the energy provided by the trigger handle 804 into a driving force that the handheld hanger installation mechanism 810 provides to the wall hanging device 110, 510.

In some embodiments, the energized element 902 is a spring that stores spring energy in response to the trigger handle 804 rotating. In such instances, the spring converts the stored spring energy into the driving force. Alternatively, the handheld hanger installation mechanism can be a powered device that discharges the wall hanging device 110, 510. In such instances, the energized element 902 can be a solenoid and/or an electric motor (e.g., a rotational or linear motor) that converts stored electrical energy into the driving force. In another embodiment, the energized element 902 can be a compressed air source, such as a carbon dioxide cartridge and/or an air compressor, which stores pneumatic energy and converts the pneumatic energy into the driving force.

At step 1310, the handheld hanger installation mechanism 810 uses the driving force to drive an impact element of the handheld hanger installation mechanism 810. In various embodiments, the energized element 902 of the handheld hanger installation mechanism 810 transfers the driving force to an impact element 904. In various embodiments, the impact element 904 is a hammer, striker, or another type of impact interface that is connected to the energized element 902 and receives the kinetic energy produced by the energized element 902.

At step 1312, the impact element contacts a wall hanging device 110, 510 with the driving force. In various embodiments, the handheld hanger installation mechanism 810 drives the wall hanging device 110 into the wallboard 410 by contacting the wall hanging device 110, 510 with the impact element 904. In various embodiments, features of the wall hanging device 110, 510 can be configured to interface with the modality of impact element and/or discharge element used to provide the driving force necessary to propel the wall hanging device 110, 510 into the wallboard 410. For example, the wall hanging device 510 includes a driving surface member 502 configured to interface with the impact element 904.

In some embodiments, the impact element 904 contacts the wall hanging device 110, 510 at an acute angle (α) relative to the wallboard surface 914. In some embodiments, the angle corresponds to the angle (α) between the anchor member 104 and the base member 102 of the wall hanging device 110. Alternatively, in some embodiments, the wall hanging device 110 is a straight rigid body. In such instances, the impact element 904 and the wall hanging device 110 are colinear, as both the wall hanging device 110 (e.g., a straight rigid body and/or the anchor member 104) and the impact element 904 are both configured at an angle (α) that corresponds to the angle (α) between the wallboard surface 412 and the portion of the rigid body that is proud to the wallboard surface 412 upon installation.

At step 1314, the wall hanging device 110, 510 penetrates into the wallboard 410. In various embodiments, the wall hanging device 110, 510 responds to the driving force by penetrating into the wallboard 410. In various embodiments, the wall hanging device 110 penetrates a distance into the wallboard 410 based on the characteristics of the wall hanging device 110. For example, the length of the anchor member 104 can configured based on can be a function of the thickness of the wallboard 410. In such instances, the anchor member 104 is to protrude far enough from the base member 102 as to be able to penetrate the wallboard 410 to a depth sufficient enough for anchoring. In addition, the length of the anchor member is not to protrude too far such that the anchor member 104 breaks through the wallboard backside 414. In various embodiments, the base member 102 of the wall hanging device 110, 510 acts as a mechanical stop to limit the penetration of the wall hanging device 110, 510 into the wallboard.

Additionally, or alternatively, in some embodiments, the handheld hanger installation mechanism 810 controls the travel limit of the wall hanging device 110, 510 by controlling the driving force applied to the wall hanging device 110, 510. In such instances, the handheld hanger installation mechanism 810 controls the travel limit of the impact element 904 in order to set the wall hanging device 110, 510 at the target depth. For example, the handheld hanger installation mechanism 810 can set the travel limit such that the base member 102 is flush to the wallboard surface 412 when installed. Alternatively, the handheld hanger installation mechanism 810 can set the travel limit of the impact element 904 to a different depth that allows for a different height of the hook member 106 from the wallboard surface 412.

In sum, a wall hanger installation system includes a handheld hanger installation mechanism that installs one or more wall hanging devices into a wallboard. In various embodiments, a user aligns the handheld hanger installation mechanism to a position along a surface of a wall. A user selects a wall hanging device (e.g., a hook, a straight rigid member, etc.) with a load capacity that can support the load of an object to be supported. In some embodiments, the user aligns the wall hanging device. Alternatively, in some embodiments, the handheld hanger installation mechanism includes a storage reservoir that stores one or more wall hanging devices.

A user provides an input to the handheld hanger installation mechanism and an energized element included in the handheld hanger installation mechanism responds by storing energy. In some embodiments, the energized element is a spring that stores spring energy in response to the user squeezing a handle. Alternatively, in some embodiments, the energized element is a solenoid, a cartridge, or another device that receives energy from an energy source in response to a user input. The energized element stores a requisite amount of energy to drive the wall hanging device into the wall. The energized element converts the stored energy into kinetic energy in the form of a driving force via an impact element included in the handheld hanger installation mechanism. The impact element contacts a portion of the wall hanging device, causing the wall hanging device to penetrate into the wall. In various embodiments, the impact element contacts the wall hanging device at an acute angle relative to the wall, causing the wall hanging device to penetrate the wall along the direction of the contact. A first portion of the wall hanging device penetrates the surface of the wall while a second portion of the wall hanging device remains proud to the wall. One or more objects can be hanged from the second portion of the wall hanging device based on the load capacity of the wall hanging device.

At least one technical advantage of the disclosed technique relative to the prior art is that the disclosed handheld hanger installation mechanism and wall hanging devices ease the effort of installing wall hanging devices on various types of walls. In particular, by using the handheld hanger installation mechanism to install one or more of the disclosed wall hanging devices, a user can install one or more wall hanging devices at desired locations along a surface of a wall with improved alignment, reduced likelihood of damage to the wallboard, and reduced likelihood of damage to utilities behind the wallboard. Further, by driving the wall hanging device into the surface of a wall at an acute angle relative to the wall, the disclosed handheld hanger installation mechanism and wall hanging devices provide minimal visual surface exposure as compared to conventional wall hangers, nails, and screws. In addition, the disclosed handheld hanger installation device automatically installs the wall hanging device at a preferred and prescribed depth, angle and distance proud to the wall so that the user will not have to manage these requirements while at the same time manage proper alignment. These technical advantages provide one or more technological improvements over prior art approaches.

1. In various embodiments, a handheld hanger apparatus, comprises an internal impact element that provides a driving force to a hanging device, and an energized element attached to the internal impact element, the energized element receiving a first energy and converting the first energy to the driving force, where, upon the internal impact element providing the driving force to install a first portion of the hanging device into a surface of a wall, at least a second portion of the hanging device is proud to the wall.

2. The handheld hanger apparatus of clause 1, where the internal impact element comprises either a hammer or a striker.

3. The handheld hanger apparatus of clause 1 or 2, where the hanging device is separate from the handheld hanger apparatus and comprises at least one of a straight rigid member or a hook.

4. The handheld hanger apparatus of any of clauses 1-3, where the hanging device further comprises a driving surface member that receives the driving force from the internal impact element.

5. The handheld hanger apparatus of any of clauses 1-4, where the hanging device further comprises a hook anchor member extending from the surface of the wall into the wall while the hanging device is proud to the wall, and the hook anchor member does not extend through a back of the wall.

6. The handheld hanger apparatus of any of clauses 1-5, where the energized element comprises one of a spring that stores spring energy, a compressed air source that stores pneumatic energy, or a solenoid that converts electrical energy into the driving force.

7. The handheld hanger apparatus of any of clauses 1-6, further comprising a handle that receives the first energy from a user input and transfer the first energy to the energized element.

8. The handheld hanger apparatus of any of clauses 1-7, further comprising a light source that projects a horizontal line or a vertical line onto the surface of the wall.

9. The handheld hanger apparatus of any of clauses 1-8, where the horizontal line is projected onto the surface of the wall at an elevation equal to a height of a base of the hanging device upon installation.

10. The handheld hanger apparatus of any of clauses 1-9, where the vertical line is projected onto the surface of the wall along a vertical axis corresponding to a major axis of the hanging device upon installation.

11. In various embodiments, a handheld hanger apparatus comprises an energized element that discharges a rigid member at an acute angle relative to a surface of a wall, where, upon the energized element discharging the rigid member to install a first portion of the rigid member into the wall, at least a second portion of the rigid member remains outside the wall and is configured to hold an object.

12. The handheld hanger apparatus of clause 11, where the rigid member comprises a hook including a hook anchor member configured to extend from the surface of the wall into the wall while the second portion of the rigid member is proud to the wall, the hook anchor member not extending through a back of the wall.

13. The handheld hanger apparatus of clause 11 or 12, where a ratio between a width of the rigid member and a thickness of the rigid member is at least 10:1.

14. The handheld hanger apparatus of any of clauses 11-13, further comprising a storage reservoir that stores one or more rigid members, and a loading device that loads a first rigid member from the storage reservoir to a first position to be discharged via the energized element.

15. The handheld hanger apparatus of any of clauses 11-14, where the storage reservoir stores the one or more rigid members axially to the surface of the wall, and the loading device loads the first rigid member axially from the storage reservoir to the first position.

16. The handheld hanger apparatus of any of clauses 11-15, where the storage reservoir stores the one or more rigid members laterally to the surface of the wall, and the loading device loads the first rigid member axially from the storage reservoir to the first position.

17. In various embodiments, a method comprises receiving, by a handle of a handheld hanger apparatus, a first force, wherein the handheld hanger apparatus is aligned with a hanging device at a first position along a surface of a wall, converting, by an energized element of the handheld hanger apparatus, the first force into a driving force, causing, by the energized element, an internal impact element of the handheld hanger apparatus to provide the driving force to install the hanging device at an acute angle relative to the surface of the wall, wherein at a first portion of the hanging device extends into the wall at the acute angle, and a second portion of the hanging device is proud to the wall.

18. The method of clause 17, further comprising projecting, by a light source, a horizontal line or a vertical line onto the surface of the wall, where the horizontal line is projected on the surface of the wall at an elevation equal to a height of a base of the hanging device upon installation, and where the vertical line is projected on the surface of the wall along a vertical axis corresponding to a major axis of the hanging device upon installation.

19. The method of clause 17 or 18, where the hanging device has a vertical load capacity, based on a width of the hanging device, that meets or exceeds a load that the hanging device is to support.

20. The method of any of clauses 17-19, where the energized element comprises one of a spring that stores spring energy, a compressed air source that stores pneumatic energy, or a solenoid that converts electrical energy into the driving force.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system or method. Aspects of the present disclosure are described above with reference to flowchart illustrations and/or block diagrams of methods and apparatus (systems) according to embodiments of the disclosure. It will be understood that each block of the flowchart illustrations and/or block diagrams, and combinations of blocks in the flowchart illustrations and/or block diagrams, can be implemented by a portion of the apparatus. The flowchart and block diagrams in the figures illustrate the architecture, functionality, and operation of possible implementations of systems and methods according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While the preceding is directed to embodiments of the present disclosure, other and further embodiments of the disclosure may be devised without departing from the basic scope thereof, and the scope thereof is determined by the claims that follow.

What is claimed is:

1. A handheld hanger apparatus, comprising:
an internal impact element that provides a driving force to a hanging device; and
an energized element attached to the internal impact element, the energized element receiving a first energy and converting the first energy to the driving force,
wherein, upon the internal impact element providing the driving force to install a first portion of the hanging device along a straight path into a surface of a wall, at least a second portion of the hanging device is proud to the wall.

2. The handheld hanger apparatus of claim 1, wherein the internal impact element comprises either a hammer or a striker.

3. The handheld hanger apparatus of claim 1, wherein the hanging device is separate from the handheld hanger apparatus and comprises at least one of a straight rigid member or a hook.

4. The handheld hanger apparatus of claim 1, wherein the hanging device further comprises a driving surface member that receives the driving force from the internal impact element.

5. The handheld hanger apparatus of claim 1, wherein:
the hanging device further comprises a hook anchor member extending from the surface of the wall into the wall while the hanging device is proud to the wall, and
the hook anchor member does not extend through a back of the wall.

6. The handheld hanger apparatus of claim 1, wherein the energized element comprises one of a spring that stores spring energy, a compressed air source that stores pneumatic energy, or a solenoid that converts electrical energy into the driving force.

7. The handheld hanger apparatus of claim 1, further comprising a handle that receives the first energy from a user input and transfer the first energy to the energized element.

8. The handheld hanger apparatus of claim 1, further comprising a light source that projects a horizontal line or a vertical line onto the surface of the wall.

9. The handheld hanger apparatus of claim 8, wherein:
the horizontal line is projected onto the surface of the wall at an elevation equal to a height of a base of the hanging device upon installation; or
the vertical line is projected onto the surface of the wall along a vertical axis corresponding to a major axis of the hanging device upon installation.

10. A handheld hanger apparatus, comprising:
an energized element that discharges a rigid member at an acute angle relative to a surface of a wall,
wherein, upon the energized element discharging the rigid member to install a first portion of the rigid member into the wall, at least a second portion of the rigid member remains outside the wall and is configured to hold an object.

11. The handheld hanger apparatus of claim 10, wherein the rigid member comprises a hook including a hook anchor member configured to extend from the surface of the wall into the wall while the second portion of the rigid member is proud to the wall, the hook anchor member not extending through a back of the wall.

12. The handheld hanger apparatus of claim 10, wherein a ratio between a width of the rigid member and a thickness of the rigid member is at least 10:1.

13. The handheld hanger apparatus of claim 10, further comprising:

a storage reservoir that stores one or more rigid members; and a loading device that loads a first rigid member from the storage reservoir to a first position to be discharged via the energized element.

14. The handheld hanger apparatus of claim 13, wherein:

the storage reservoir stores the one or more rigid members axially to the surface of the wall; and the loading device loads the first rigid member axially from the storage reservoir to the first position.

15. The handheld hanger apparatus of claim 13, wherein:

the storage reservoir stores the one or more rigid members laterally to the surface of the wall; and the loading device loads the first rigid member axially from the storage reservoir to the first position.

18

16. A method comprising:

receiving, by a handle of a handheld hanger apparatus, a first force, wherein the handheld hanger apparatus is aligned with a hanging device at a first position along a surface of a wall;

converting, by an energized element of the handheld hanger apparatus, the first force into a driving force, causing, by the energized element, an internal impact element of the handheld hanger apparatus to provide the driving force to install the hanging device at an acute angle relative to the surface of the wall, wherein at a first portion of the hanging device extends into the wall at the acute angle, and a second portion of the hanging device is proud to the wall.

17. The method of claim 16, further comprising:

projecting, by a light source, a horizontal line or a vertical line onto the surface of the wall, wherein the horizontal line is projected on the surface of the wall at an elevation equal to a height of a base of the hanging device upon installation, and wherein the vertical line is projected on the surface of the wall along a vertical axis corresponding to a major axis of the hanging device upon installation.

18. The method of claim 16, wherein the hanging device has a vertical load capacity, based on a width of the hanging device, that meets or exceeds a load that the hanging device is to support.

19. The method of claim 16, wherein the energized element comprises one of a spring that stores spring energy, a compressed air source that stores pneumatic energy, or a solenoid that converts electrical energy into the driving force.

* * * * *